United States Patent

[11] 3,588,356

[72] Inventors Stephen Moshier
Arlington;
Dwight W. Batteau, deceased, late of
Cambridge, Mass.; Blanca D. Batteau,
executor, Cambridge, Mass.
[21] Appl. No. 870,691
[22] Filed June 12, 1969
[45] Patented June 28, 1971
[73] Assignee the United States of America as represented by the Secretary of the Navy

[54] VOCAL PULSE DETECTOR
2 Claims, 4 Drawing Figs.

[52] U.S. Cl. 179/1
[51] Int. Cl. G10l 1/00
[50] Field of Search 179/1 (SA), 1 (VC)

[56] References Cited

UNITED STATES PATENTS 2,975,367 3/1961 Adams et al. 328/114

*Primary Examiner*—Kathleen H. Claffy
*Assistant Examiner*—Douglas W. Olms
*Attorneys*—Edgar J. Brower and Roy Miller

ABSTRACT: A speech recognition system for identifying the time at which a vocal pulse occurs comprising electronic circuitry including differentiating circuits and rectifiers for producing a single output pulse at and only at the time of the input vocal pulse corresponding to a particular phonetic sound.

INVENTORS.

BY

ROY MILLER
ATTORNEY.

VOCAL PULSE DETECTOR

BACKGROUND OF THE INVENTION

One of the desirable qualities in a speech recognition system useful in speech research is that the system be able to identify the moment at which a vocal pulse occurs.

SUMMARY OF THE INVENTION

The present invention comprises an electronic circuit for identifying the time at which such vocal pulses occur and comprises two differentiating circuits, rectifier, another differentiator, another rectifier and a last differentiator which provides a single output pulse whenever a vocal pulse occurs.

DESCRIPTION OF THE PREFERRED EMBODIMENT

Figure 1:
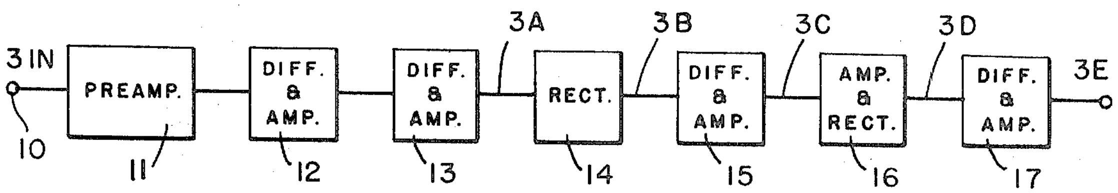
FIG. 1 is a block diagram of the speech recognition system.

In FIG. 1, a vocal pulse is coupled in at input 10 to the input of a preamplifier 11. The output of the preamplifier 11 is coupled to the input of a differentiator and amplifier 12 where a first differentiation is done on the pulse. The output of the differentiator and amplifier 12 is then coupled to the input of another differentiator and amplifier 13 where another differentiation is performed on the vocal pulse to provide the second derivative of the amplitude of the pulse.

The output of the second differentiator and amplifier 13 is rectified or clipped in rectifier 14 the output of which is coupled to another differentiator and amplifier 15 where another differentiation is performed on the vocal pulse.

The output of the third differentiator and amplifier 15 is coupled to another amplifier and rectifier 16 where another clipping takes place and the output of the rectifier is coupled to the input of the final differentiator and amplifier 17 to provide an output therefrom comprising a single voltage spike corresponding to the moment of the input voltage pulse.

Figure 2A:
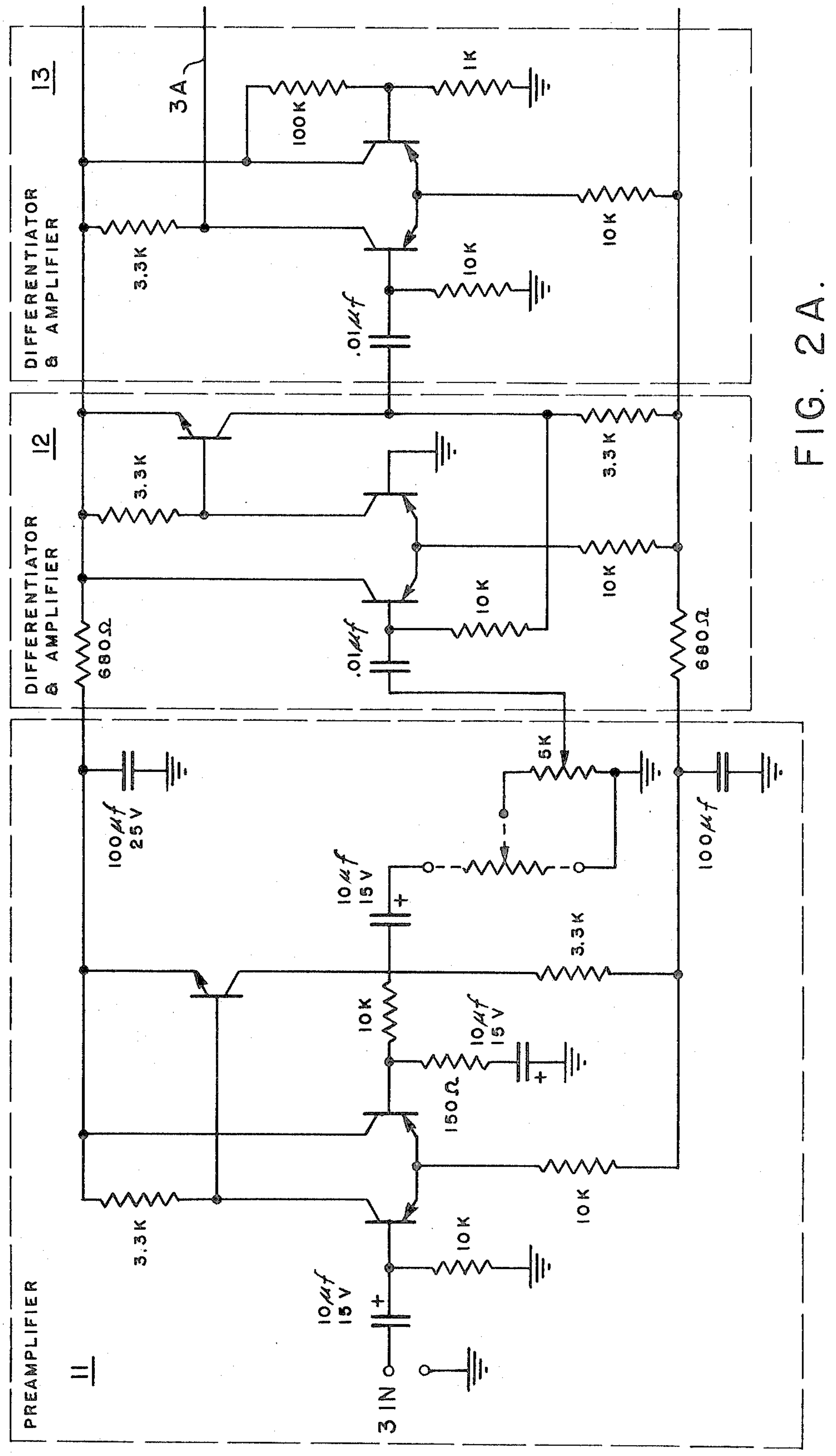
FIGS. 2A and 2B are the detailed schematic of the block diagram of FIG. 1.
Figure 2B:
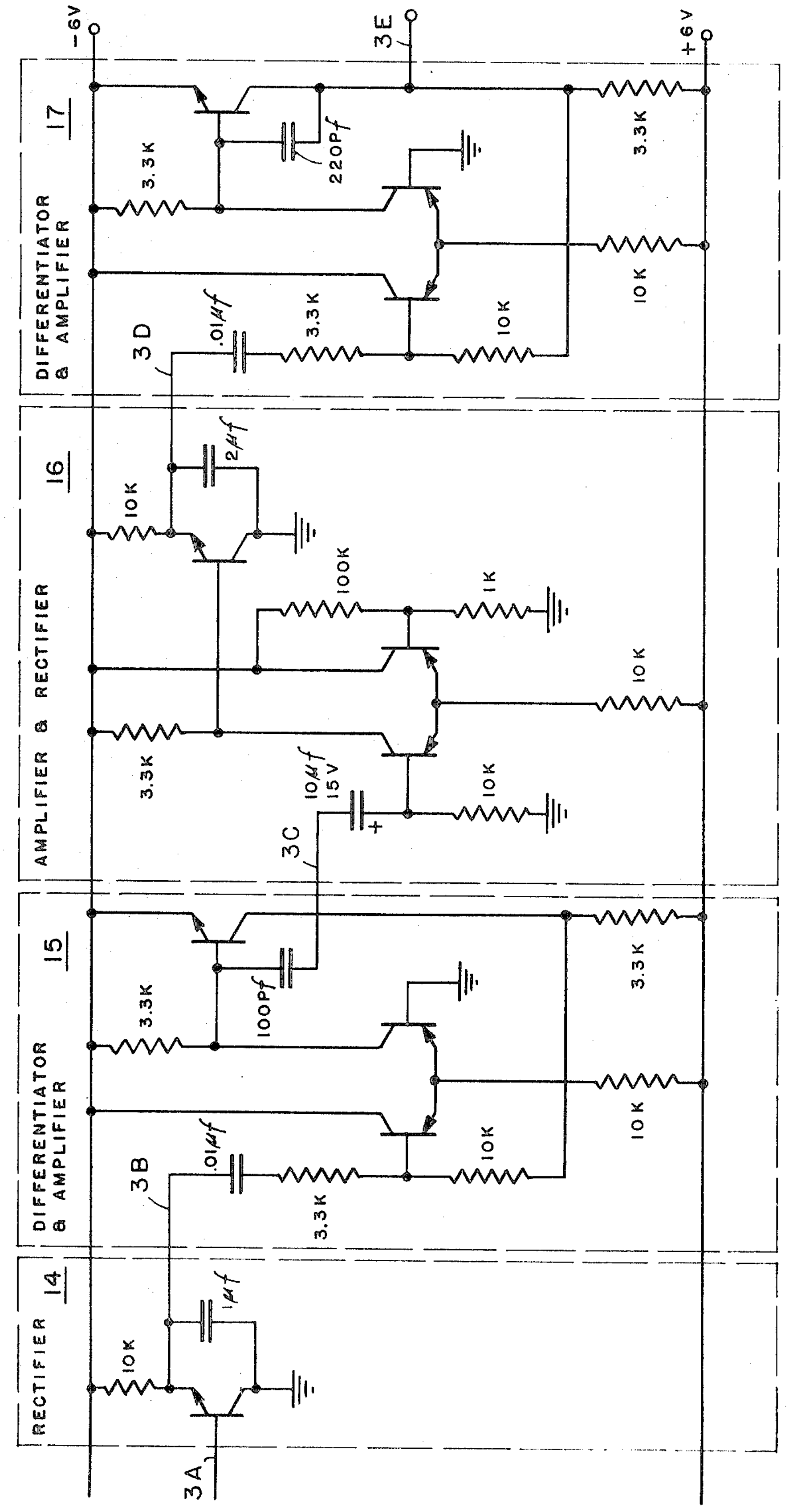

FIGS. 2A and 2B are the detailed schematic corresponding to the block diagram of FIG. 1.

Figure 3:
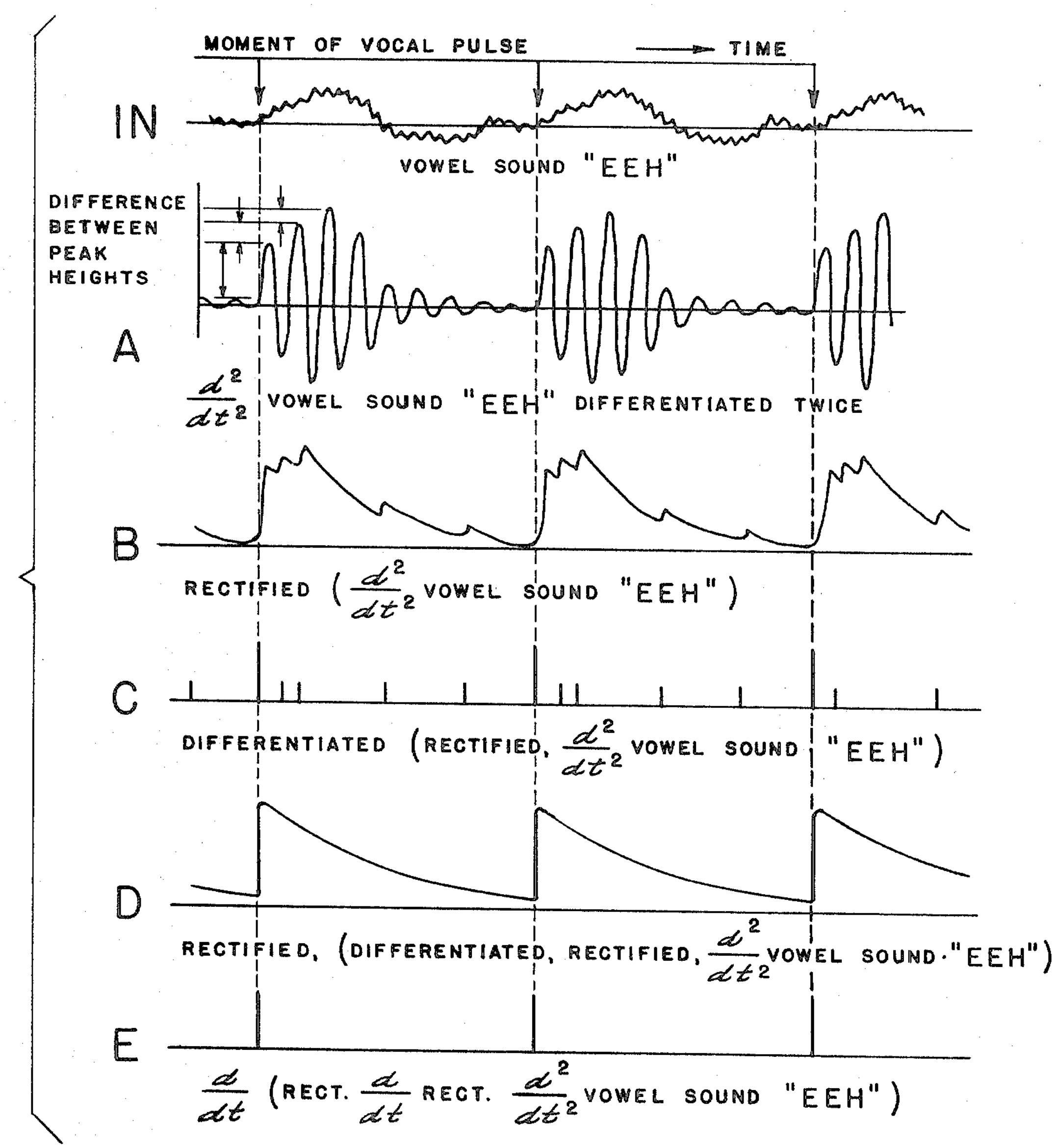
FIG. 3 illustrates waveforms at various points in FIGS. 1, 2A and 2B.

The waveforms of FIG. 3 illustrate the result of various actions performed on the input vocal pulse. For instance, FIG. 3 IN illustrates the vowel sound EEH which is a sinusoidal waveform which varies with time.

The rate of change of amplitude is maximum at the time of the vocal pulse, as is the rate of the rate of change, or second derivative of the amplitude. Therefore, the first step in identifying the time of the vocal pulse requires differentiating the signal twice. This produces a signal corresponding to FIG. 3A.

It should be noted that the peak amplitude of the resultant signal may occur at the second or third maximum, but that the largest difference between peaks occurs at the first maximum following the moment of the vocal pulse. Thus, a measurement of differences in peaks will show a maximum at the time of the vocal pulse initiation. In order to derive this difference in peaks the signal is then rectified in rectifier 14. The time constant of an RC filter in the rectifier 14 is chosen properly so that the waveform of FIG. 3B results.

If the output signal from rectifier 14 is now differentiated, the differences in peak height are obtained and results in the waveform of FIG. 3C.

If the output of the differentiator and amplifier 15 is again rectified or clipped in rectifier and amplifier 16 and a proper choice of RC time constant in the filter made, the voltage at the capacitor in the RC filter will always be greater than the height of the small pulses of FIG. 3C, so that only the vocal pulse charges the capacitor. The resulting waveform is illustrated in FIG. 3D.

When the waveform of FIG. 3D is again differentiated a pulse is obtained at and only at the moment of the vocal pulse as shown in FIG. 3E.

By utilizing this circuitry and process inherent therein, the vocal pulse is detected and isolated for any desired use.

We claim:

1. A speech recognition system comprising:

input means adapted to receive an input voice signal in the form of an electrical waveform;

differentiating means for deriving the maximum rate of change of the input voice signal electrically connected to said input means;

clipping means electrically connected to said differentiating means for removing the portion of said electrical waveform remaining after differentiation below a datum value;

other differentiating means electrically connected to said clipping means for differentiating the output of said clipping means;

other clipping means electrically connected to said other differentiating means for removing portions of the output from said other differentiating means below another datum value; and final differentiating means electrically connected to said other clipping means for producing an output pulse only at the moment of the vocal pulse embedded in said input voice signal.

2. A speech recognition system as set forth in claim 1 wherein:

the first differentiating means for deriving the maximum rate of change comprises two differentiators for taking the second derivative of the amplitude of the waveform.